(12) United States Patent
Gupta

(10) Patent No.: US 8,842,536 B2
(45) Date of Patent: Sep. 23, 2014

(54) INGRESS RATE LIMITING

(75) Inventor: Somesh Gupta, San Jose, CA (US)

(73) Assignee: Brocade Communications Systems, Inc., San Jose, CA (US)

(\*) Notice: Subject to any disclaimer, the term of this patent is extended or adjusted under 35 U.S.C. 154(b) by 212 days.

(21) Appl. No.: 12/977,933

(22) Filed: Dec. 23, 2010

(65) Prior Publication Data

US 2012/0163175 A1      Jun. 28, 2012

(51) Int. Cl.
*H04L 12/26* (2006.01)
*H04L 12/801* (2013.01)

(52) U.S. Cl.
CPC ................................ *H04L 47/10* (2013.01)
USPC .......................... 370/235; 370/230; 370/236

(58) Field of Classification Search
CPC ....................................................... H04L 47/10
USPC ............. 370/229, 230, 230.1, 231, 232, 235, 370/236, 359, 419, 463
See application file for complete search history.

(56) References Cited

U.S. PATENT DOCUMENTS

| | | | | |
|---|---|---|---|---|
| 5,633,859 | A * | 5/1997 | Jain et al. | 370/234 |
| 7,061,864 | B2 * | 6/2006 | van Everdingen | 370/233 |
| 7,372,814 | B1 * | 5/2008 | Chiruvolu et al. | 370/235 |
| 7,675,857 | B1 * | 3/2010 | Chesson | 370/235 |
| 7,756,028 | B2 * | 7/2010 | Fortin et al. | 370/230.1 |
| 7,821,939 | B2 * | 10/2010 | DeCusatis et al. | 370/232 |
| 7,957,394 | B1 * | 6/2011 | Cohen et al. | 370/395.21 |
| 7,962,647 | B2 * | 6/2011 | Suri et al. | 709/238 |
| 8,036,125 | B2 * | 10/2011 | Pozhenko et al. | 370/235 |
| 8,234,400 | B2 * | 7/2012 | Bansal et al. | 709/233 |
| 2003/0231655 | A1 * | 12/2003 | Kelton et al. | 370/468 |
| 2006/0193261 | A1 | 8/2006 | Sethi | |
| 2007/0165527 | A1 * | 7/2007 | Sultan et al. | 370/230 |
| 2008/0148341 | A1 * | 6/2008 | Ferguson et al. | 726/1 |
| 2009/0103434 | A1 * | 4/2009 | Madsen et al. | 370/232 |
| 2009/0116381 | A1 * | 5/2009 | Kanda | 370/229 |
| 2009/0141630 | A1 | 6/2009 | Denzel et al. | |
| 2010/0027420 | A1 * | 2/2010 | Smith | 370/235 |
| 2010/0128605 | A1 * | 5/2010 | Chavan et al. | 370/230.1 |
| 2010/0228878 | A1 * | 9/2010 | Xu et al. | 709/233 |
| 2012/0042095 | A1 * | 2/2012 | Kotha et al. | 709/233 |
| 2012/0079478 | A1 * | 3/2012 | Galles et al. | 718/1 |

\* cited by examiner

*Primary Examiner* — Kwang B Yao
*Assistant Examiner* — Nguyen Ngo
(74) *Attorney, Agent, or Firm* — Wong, Cabello, Lutsch, Rutherford & Brucculeri, L.L.P.

(57) ABSTRACT

A network device monitors the traffic of individual flows through one of its ingress ports and, if the traffic volume exceeds a predetermined threshold, signals for a reduction in data traffic volume transmitted to that ingress port from one or more source devices. Example signals may include without limitation a unicast congestion message sent to the source of a flow, an Explicit Congestion Notification to one or more source devices, and the dropping of packets by the receiving device. In response to such signals, one or more of the source devices decrease the transmission rate of data traffic to the receiving device.

18 Claims, 7 Drawing Sheets

INGRESS RATE LIMITING

BACKGROUND

A device connected to a network of switches can communicate with various other network-attached devices, receiving data traffic from and transmitting data traffic to one or more of these other devices. For example, a server may receive a high volume of data traffic from multiple backup applications executing on assorted client computers connected to the network. In some circumstances, an ingress port of the server may become overutilized by such traffic (e.g., violating a threshold set in a Service Level Agreement (SLA)). In such circumstances, the network or server owner may face increased service costs or decreased performance of high priority traffic flows if the traffic through the ingress port exceeds such a threshold.

It is a challenge, however, for a receiving device to manage the data traffic volume sent to it because it does not directly control the transmission source or sources. As such, the receiving device typically receives the volume of data traffic that these sources transmit to it, at least the point of failure, without substantial options for reducing this traffic volume at the sources.

SUMMARY

Implementations described and claimed herein address the foregoing problems by monitoring the traffic of individual flows through an ingress port of a receiving device and, if the traffic volume exceeds a predetermined threshold, signaling for a reduction in data traffic volume transmitted to that ingress port from one or more source devices. Example signals may include without limitation a unicast congestion message sent to the source of a flow, an Explicit Congestion Notification to one or more source devices, and the dropping of packets by the receiving device. In response to such signals, one or more of the source devices decrease the transmission rate of data traffic to the receiving device. Furthermore, such thresholds may be enforced at the port-level as well as at the virtual machine level (e.g., for each virtual machine internally coupled to a port).

Other implementations are also described and recited herein.

BRIEF DESCRIPTIONS OF THE DRAWINGS

DETAILED DESCRIPTIONS

Figure 1:
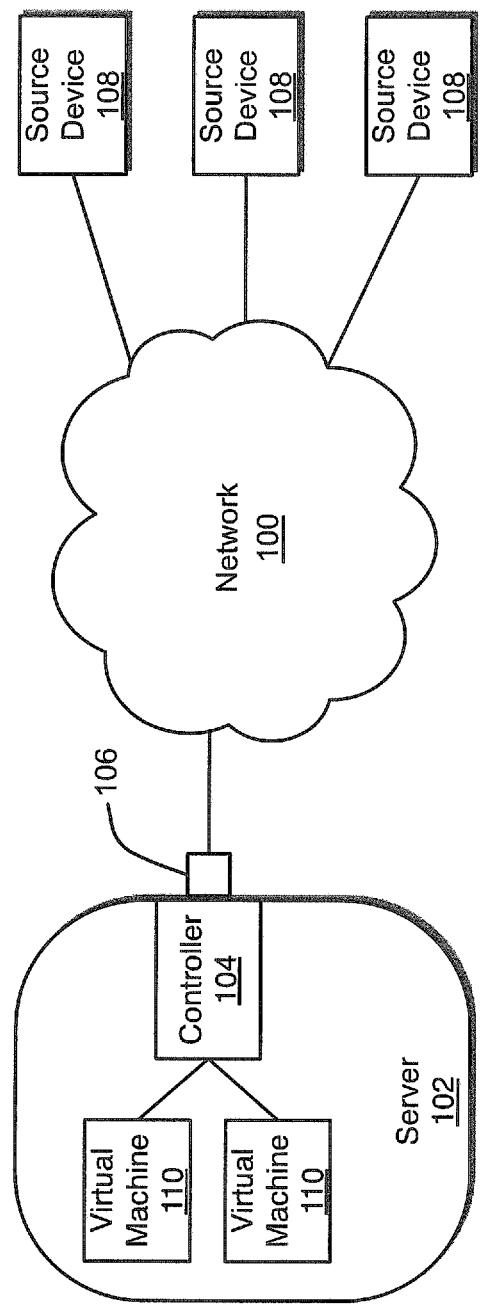
FIG. 1 illustrates a network connected to a server having an example rate limiting network controller at an ingress port.

FIG. 1 illustrates a network 100 connected to a server 102 having an example rate limiting network controller 104 at an ingress port 106. The network 100 communicatively couples source devices 108 (e.g., client devices) to the server 102. The network 100 may be any group of computers or devices interconnected by communication channels (e.g., a local area network (LAN), a wide area network (WAN), a virtual private network (VPN), Ethernet, Fiber Channel, optical fiber, etc.). Communications between the server 102 and the source devices 108 may be bidirectional. For example, the source devices 108 can send files in a volume of data packets to the server 102 via the network 100, and the server 102 can return an acknowledgement as each data packet is received.

The server 102 may include one or more virtual machines 110, each that executes specific instructions similar to that executed by a physical machine. Each of the virtual machines 110 are limited to resources and abstractions provided by each virtual machine. Further, the virtual machines 110 may be system virtual machines and/or process virtual machines. System virtual machines provide a complete system platform, which supports the execution of a complete operating system (OS). In contrast, process virtual machines are desired to run a single program (i.e., support a single process). Each of the virtual machines 110 shares underlying physical machine resources of the server 102.

The virtual machines 110 each have a maximum rate at which they are to process data packets incoming from the network 100. The maximum incoming frame rate for each of the virtual machines may be the same or vary between the virtual machines. The rate limiting network controller 104 may monitor packet traffic incoming from the network 100 to each of the virtual machines 110 via the ingress port 106 and apply a rate limiting function when the rate at which the ingress port receives data traffic for a particular virtual machine exceeds that virtual machine's maximum incoming frame rate (e.g., meets or exceeds a threshold). Example rate limiting functions that the rate limiting network controller 104 may use to rate limit the incoming frames are discussed in detail with respect to FIGS. 3-5.

Figure 2:
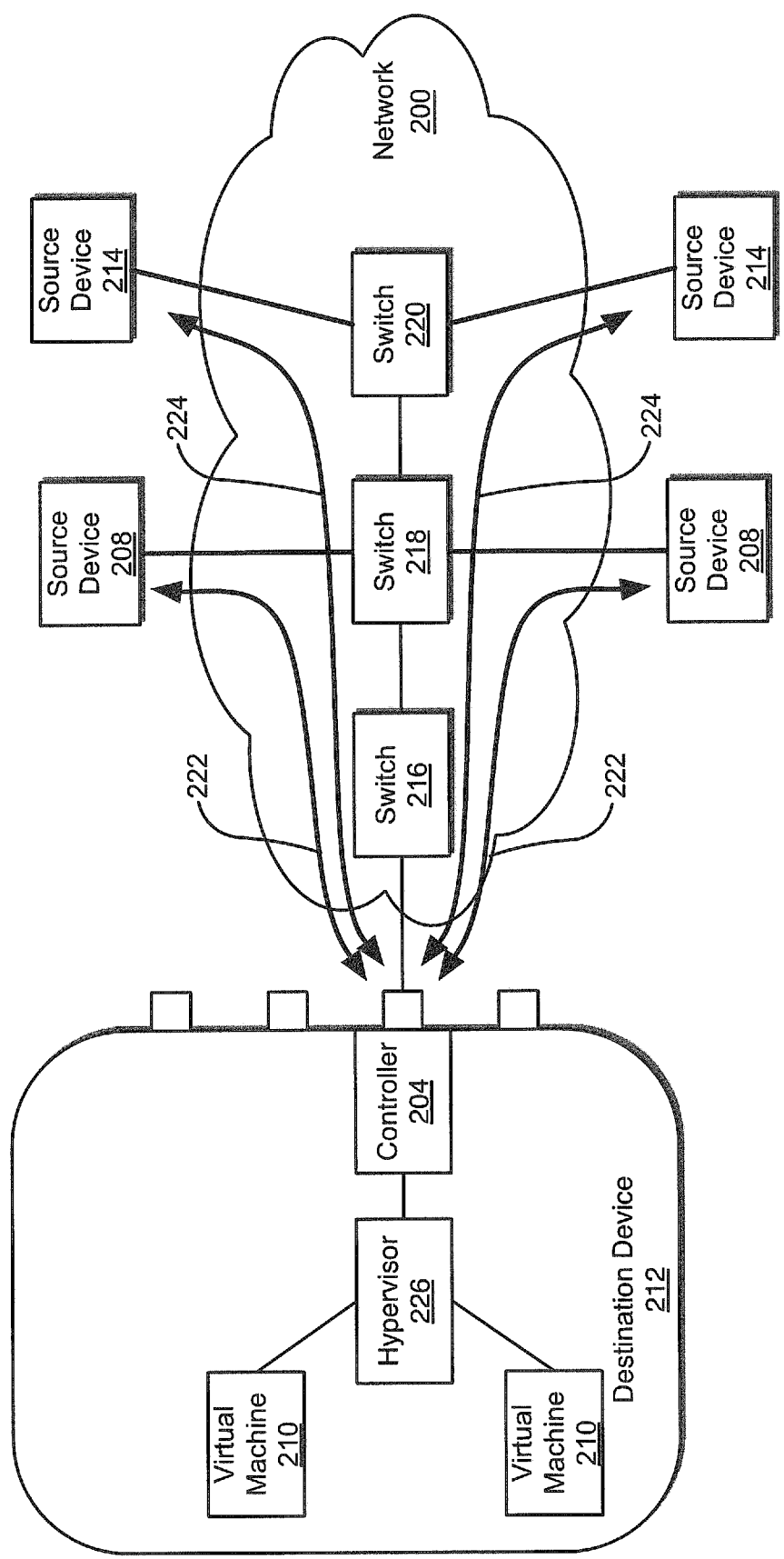
FIG. 2 illustrates a network connected to a destination device having an example rate limiting network controller at an ingress port receiving traffic from multiple source devices.

FIG. 2 illustrates a network 200 connected to a destination device 212 having an example rate limiting network controller 204 at an ingress port 206 receiving traffic from multiple source devices 208, 213, 214. The network 200 may possess one or more switches (e.g., switches 216, 218, 220 for directing traffic from the multiple source devices 208, 213, 214 within the network 200 and out of the network 200 to destination devices such as the destination device 212. For example, data packets inbound to the destination device 212 from the source devices 208 are routed through switches 216, 218 before arriving at the ingress port 206 of the destination device 212, as illustrated by bi-directional data flows 222. Outbound data packets from the destination device 212 to the source devices 208 flow in an opposite manner, as also illustrated by data flows 222. Further, data packets inbound to the destination device 212 from the source devices 213, 214 are routed through switches 216, 218, 220 before arriving at the ingress port 206 of the destination device 212, as illustrates by bi-directional data flows 224. Outbound data packets from the destination device 212 to the source devices 213, 214 flow in an opposite manner, as also illustrated by data flows 224. The switches may be any type of computer networking device that connects components of the network 200 (e.g., network hubs, network bridges, routers, unmanaged switches, managed switches, switches operating at various levels, etc.) together.

The destination device 212 may be any computing device that stores one or more virtual machines (e.g., virtual machines 209, 210), each configured to execute a set of specific instructions. The destination device 212 may have a number of ingress/egress ports (e.g., ingress port 206) connected to rate limiting network controllers (e.g., controller 204). Further, the destination device 212 includes a hypervisor 226. The hypervisor 226 (or virtual machine monitor (VMM)) controls operating states of each of the virtual machines 209, 210 and distributes data packets incoming to the destination device 212 to the correct virtual machine 209, 210 within the destination device 212. In some implementations, the hypervisor 226 is not included in the destination device 212 and the data packets are distributed to the correct virtual machine 220 by the controller 204. In still other implementations, the function of the hypervisor 226 and the controller 204 are merged together in one computing component.

Each of the virtual machines 209, 210 and/or ingress port 206 has a preset maximum frame rate at which they can process incoming data from the network 200. The maximum frame rate may be a function of processing speed limits within the destination device 212 or may be preset to a rate less than what each virtual machine can actually process (e.g., to comply with a service level agreement (SLA) or to prevent a specific virtual machine from monopolizing the processing resources of the destination device 212). In another implementation, some virtual machines perform less important tasks than other virtual machines. The virtual machines that perform less important tasks may have a preset maximum frame rate less than other virtual machines. As a result, the processing resources may be allocated within the destination device 212 based on the importance of the tasks performed by each of the virtual machines. In yet another implementation, a virtual machine may be allowed to accept as many frames as possible from one source device and has a preset rate limit on frames from another source device.

The controller 204 may be equipped with one or more counters and timers. Using the counters and timers, the controller 204 can monitor the rate at which data packets are incoming to each of the virtual machines 209, 210. When the controller 204 detects that the rate of incoming data packets to any one of the virtual machines 209, 210 exceeds the preset maximum frame rate of that virtual machine, the controller 204 may signal the source device 214 that is contributing to the overload of the overloaded virtual machine. The contributing source device can be identified from the source addressing contained in the overloading packets. The signaling is discussed in more detail with respect to FIGS. 3-5.

Figure 3:
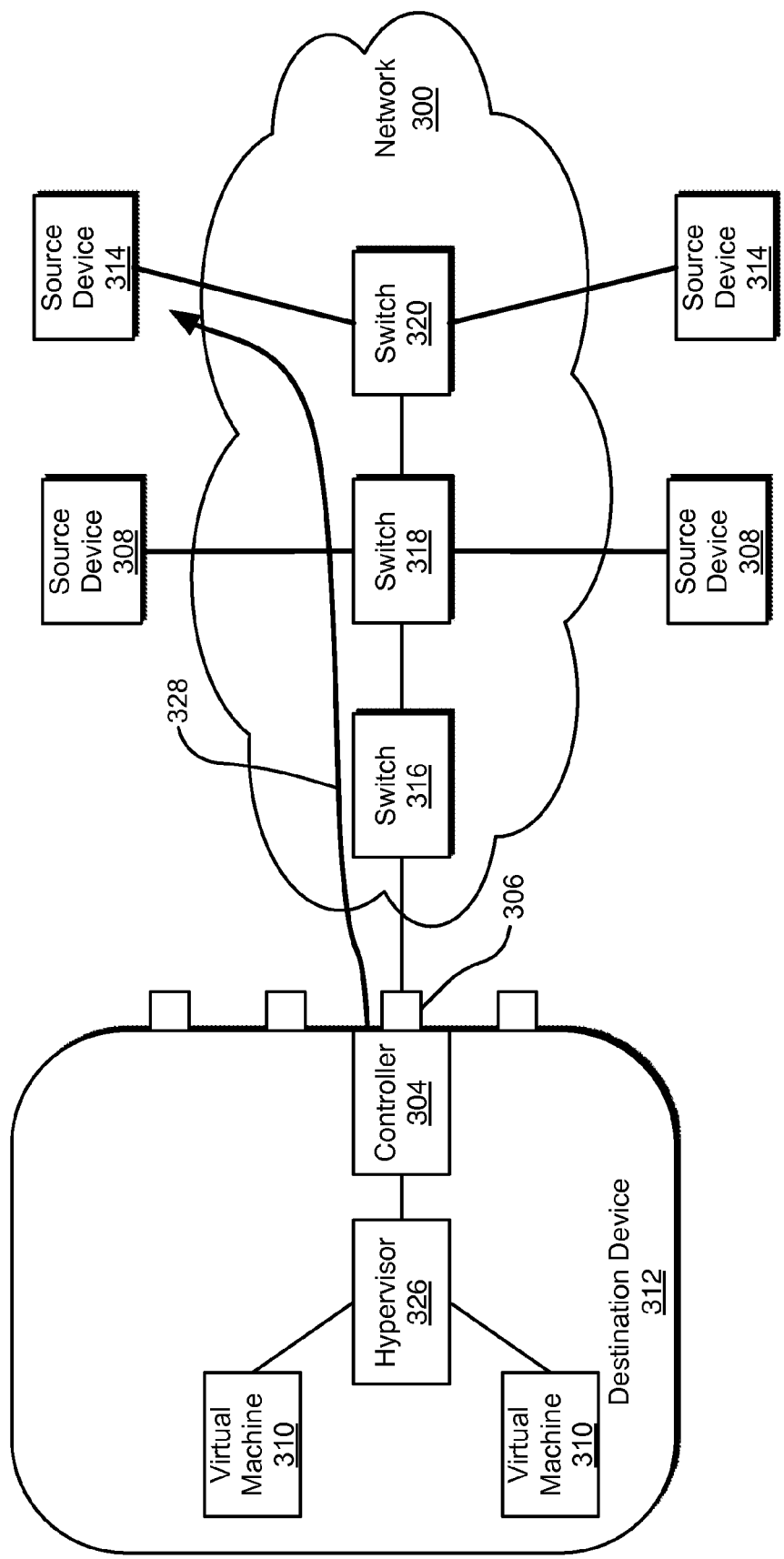
FIG. 3 illustrates a network connected to a destination device having an example rate limiting network controller at an ingress port sending a unicast congestion message to a source device.

FIG. 3 illustrates a network 300 connected to a destination device 312 having an example rate limiting network controller 304 at an ingress port 306 sending a unicast congestion message (illustrated by data flow 328) to a source device 314. The unicast congestion message may also be referred to as a "quantized congestion notification." In one implementation, the unicast congestion message originates at the network controller 304. The destination device 312 receives data packets from source devices 308, 313, 314 via switches 316, 318, 320. The data packets enter the destination device 312 via the ingress port 306 and are monitored by the controller 304. The data packets are then distributed to one or more virtual machines 309, 310 by a hypervisor 326.

When the controller 304 detects that the rate of incoming data packets to any one of the virtual machines 309, 310 exceeds the preset maximum frame rate (e.g., an allocated or pre-determined rate threshold) of that virtual machine, the controller 304 may send the unicast congestion message (illustrated by the data flow 328) to the source device that is contributing to the overload of the overloaded virtual machine (here, source device 314). The unicast congestion message may be sent back through the switches 316, 318, 320 to the source device 314 or any other route through the network 300 that reaches the source device 314. The unicast congestion message instructs the contributing source device 314 to reduce or stop its data packet transmission rate so that the rate of incoming data packets to the overloaded virtual machine decreases.

Further, if multiple source devices are contributing to overloading the virtual machine, the unicast congestion messages may be sent to multiple source devices. For example, reducing the rate of incoming data packets from one source device may be insufficient to eliminate the overload of the virtual machine. Sending multiple unicast congestion messages to multiple source devices may be more effective at resolving the overload. In one implementation, the source device that is sending the most data packets is chosen by the controller 304 as a target of the unicast congestion message. In another implementation, the controller 304 may send the unicast congestion message to all the source devices that are contributing to overloading the virtual machine (or at least all the source devices that are sending at least a threshold rate of data packets) so that the reduction of the data packet transmission rate is spread across the network 300 rather than being targeted at one specific source device. Additionally, the controller 304 may detect that multiple virtual machines are being overloaded and send the unicast congestion message to one or more source devices that are contributing to overloading the multiple virtual machines.

In an alternative implementation, the hypervisor 326 may send the unicast congestion message to one or more source devices that are contributing to overloading the virtual machine instead of the controller 304. As discussed with respect to FIG. 2, the function of the hypervisor 326 and the controller 304 may be merged into one component within or attached to the destination device 312.

Figure 4:
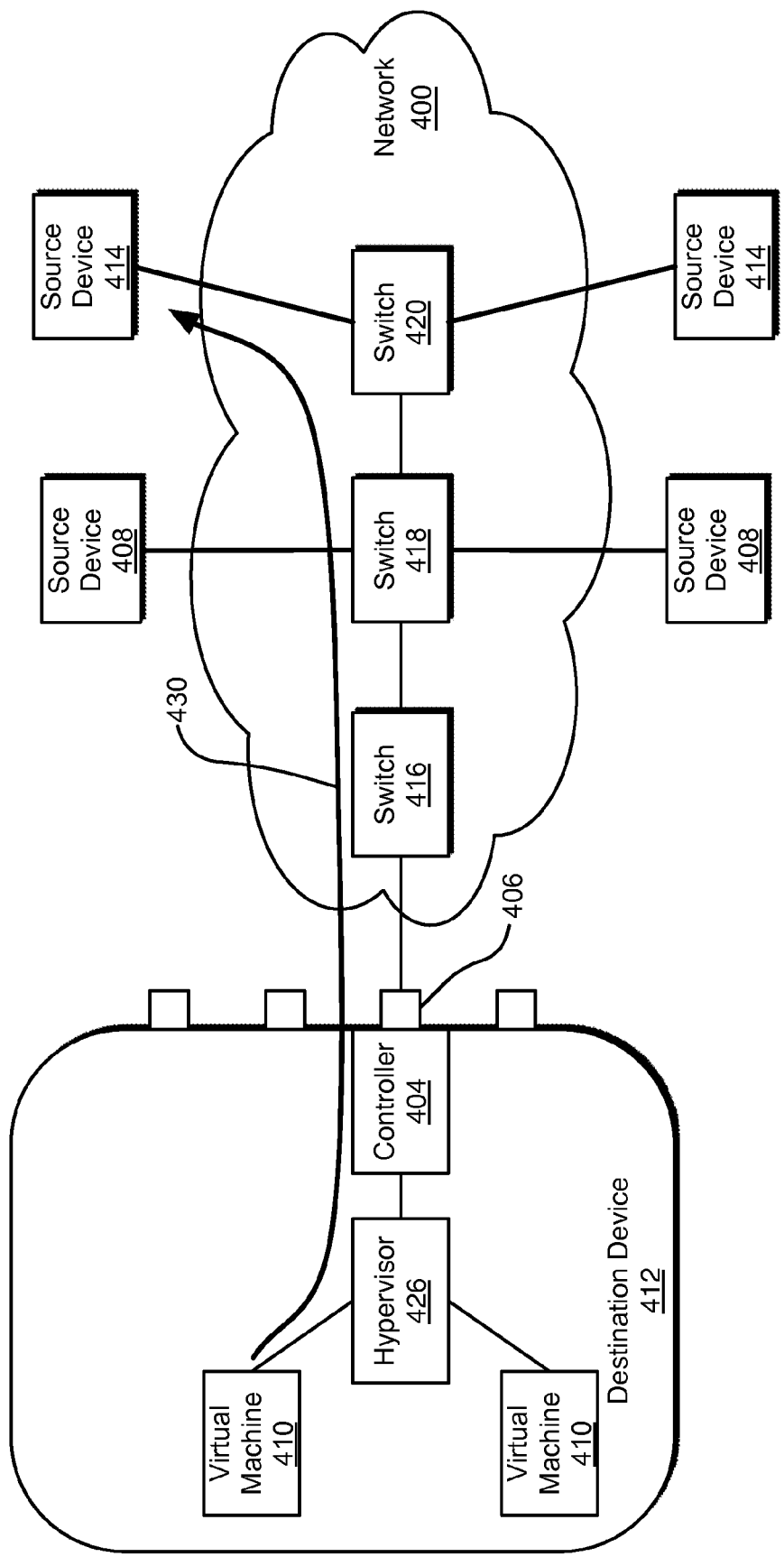
FIG. 4 illustrates a network connected to a destination device having an example rate limiting network controller at an ingress port sending an Explicit Congestion Notification to a source device.

FIG. 4 illustrates a network 400 connected to a destination device 412 having an example rate limiting network controller 404 at an ingress port 406 sending an Explicit Congestion Notification (ECN) (illustrated by data flow 430) to a source device 414. The destination device 412 receives data packets from the source devices 408, 413, 414 via switches 416, 418, 420. The data packets enter the destination device 412 via the ingress port 406 and are monitored by the controller 404. The data packets are then distributed to one or more virtual machines (e.g., virtual machine 409) by a hypervisor 426. In one implementation, the controller 404 possesses one or more timers and courter used to track the frame rates to each of the virtual machines 409, 410 within the destination device 412. When the controller 404 detects an overload in the incoming frame rate to one or more of the virtual machines, the controller 404 notifies the overloaded virtual machine, which in turn sends the ECN (illustrated by data flow 430) to the source device 414. In one implementation, the overloaded virtual machine originates the ECN and sends the ECN to the source device 414 via the network controller 404. Network controller 404 relays the ECN from the overloaded virtual machine to the source device 414.

Each of the virtual machines has a preset maximum frame rate at which they can process incoming data from the network 400 (e.g., an allocated or pre-determined rate threshold). The maximum frame rate may be a function of processing speed limits within the destination device 412 or may be preset to a rate less than what each virtual machine can actually process (e.g., to comply with a service level agreement (SLA) or to prevent a specific virtual machine from monopolizing the processing resources of the destination device 412). In another implementation, some virtual machines perform less important tasks than other virtual machines. The virtual machines that perform less important tasks may have a preset maximum frame rate less than other virtual machines. As a result, the processing resources may be allocated within the destination device 412 based on the importance of the tasks performed by each of the virtual machines. In yet another implementation, a virtual machine may be allowed to accept as many frames as possible from one source device and has a preset rate limit on frames from another source device.

In this implementation, both the virtual machine 409 and the source devices 408, 413, 414 support ECNs. The virtual machine 409 sends an ECN back to the source device 414, which is sending data packets to the virtual machine 409 and causing the virtual machine 409 to become congested (e.g., nearing, meeting, or exceeding its maximum frame rate). The ECN may be sent back through the hypervisor 426, controller 404, and switches 416, 418, 420 to the source device 414 or any other route through the network 400 that reaches the source device 414. The ECN instructs the contributing source device 414 to reduce or stop its data packet transmission rate so that the rate of incoming data packets to the congested virtual machine 409 decreases.

Further, if multiple source devices are contributing to overloading the virtual machine 409, the ECN may be sent to multiple source devices. In one implementation, the source device that is sending the most data packets is chosen by the overloaded virtual machine 409 as a target of the ECN. In another implementation, the overloaded virtual machine 409 may send the ECN to all the source devices that are contributing to overloading the virtual machine 409 (or at least all the source devices that are sending at least a threshold rate of data packets) so that the reduction of the data packet transmission rate is spread across the network 400 rather than being targeted at one specific source device. In alternative implementations, the hypervisor 426 or the controller 404 may send the ECN to one or more source devices are contributing to overloading the virtual machine 409.

Figure 5:
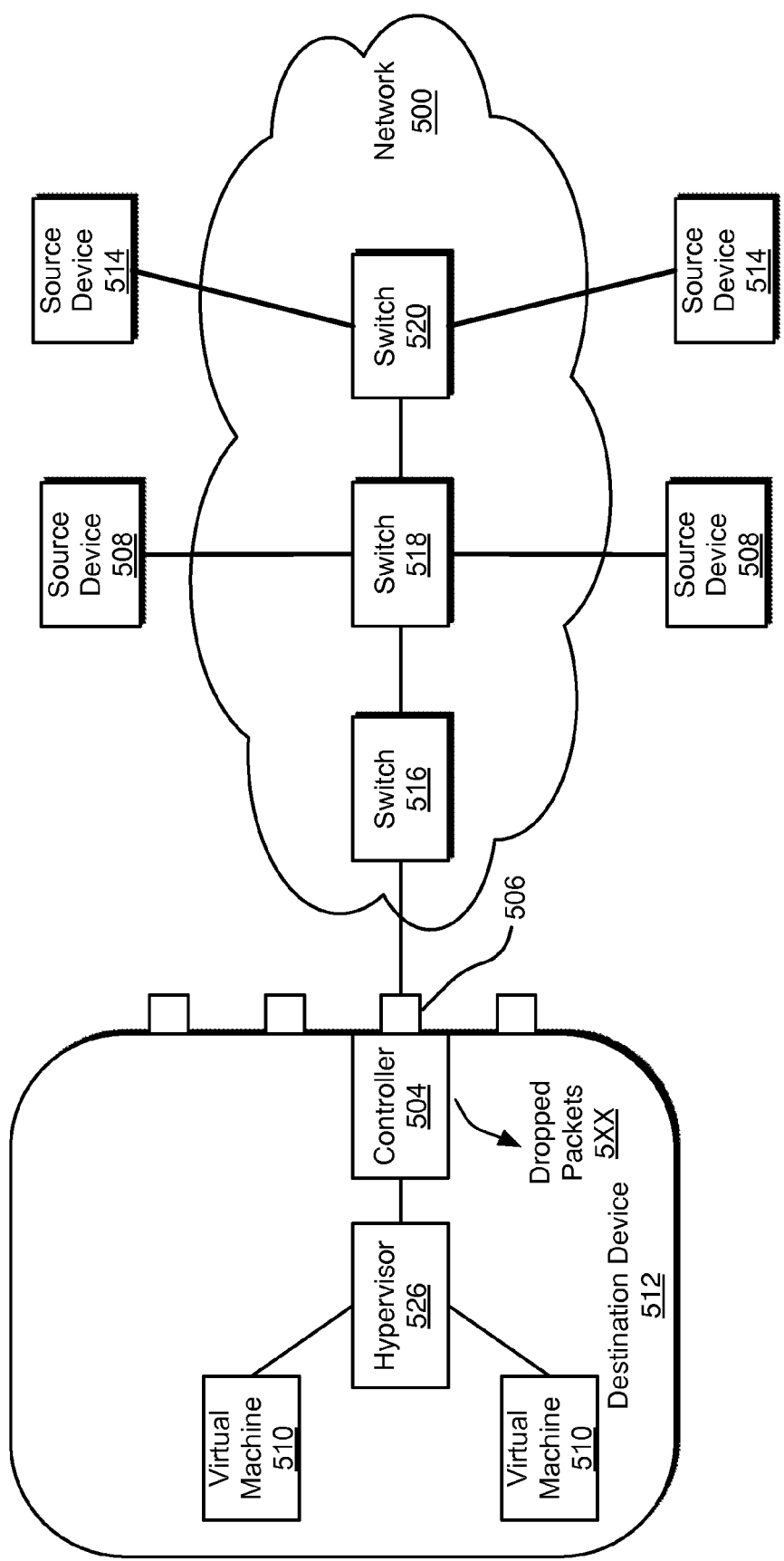
FIG. 5 illustrates a network connected to a destination device having an example rate limiting network controller at an ingress port dropping packets to signal a source device to reduce traffic volume transmitted to the destination device.

FIG. 5 illustrates a network 500 connected to a destination device 512 having an example rate limiting network controller 504 at an ingress port 506 dropping packets 534 to signal a source device 508 to reduce traffic volume transmitted to the destination device 512. The destination device 512 receives data packets from source devices 508, 513, 514 via one or more of switches 516, 518, 520. The data packets enter the destination device 512 via the ingress port 506 and are monitored by the controller 504. The data packets are then distributed to one or more virtual machines 510 by a hypervisor 526.

Each of the virtual machines 510 have a preset maximum frame rate at which they can process incoming data from the network 500 (e.g., an allocated or pre-determined rate threshold). The maximum frame rate may be a function of processing speed limits within the destination device 512 or may be preset to a rate less than what each virtual machine 509, 510 can actually process (e.g., to comply with a service level agreement (SLA) or to prevent a specific virtual machine from monopolizing the processing resources of the destination device 512). In another implementation, some virtual machines perform less important tasks than other virtual machines. The virtual machines that perform less important tasks may have a preset maximum frame rate less than other virtual machines. As a result, processing resources may be allocated within the destination device 512 based on the importance of the tasks performed by each of the virtual machines.

The controller 504 may be equipped with a counter and a timer. Using the counter and the timer, the controller 304 can monitor the rate at which data packets are incoming to each of the virtual machines 509, 510. When the controller 504 detects that the rate of incoming data packets to any one of the virtual machines 509, 510 exceeds the preset maximum frame rate of that virtual machine, the controller 504 may start to drop incoming data packets (i.e., dropped data packets 534). In some implementations, the controller 504 may request that the dropped data packets 534 be re-transmitted from the source device 508 that the dropped data packets 534 were originally sourced from. The source device 508 may then attempt to re-transmit the dropped data packets 534. As a result, the incoming frame rate to the overloaded virtual machine is reduced.

Further, if multiple source devices 508 are contributing to overloading the virtual machine, the controller 504 may drop data packets from one or more of the multiple source devices 508. In one implementation, the source device 508 that is sending the most data packets is chosen by the controller 504 as a target of the dropped packets 534. In another implementation, the controller 504 may drop packets from all the source devices 508 that are contributing to overloading the virtual machine (or at least all the source devices 508 that are sending at least a threshold rate of data packets) so that the reduction of the data packet transmission rate is spread across the network 500 rather than being targeted at one specific source device 508. Additionally, the controller 504 may detect that multiple virtual machines are being overloaded and drop data packets from one or more source devices 508 that are contributing to overloading the multiple virtual machines.

In an alternative implementation, the hypervisor 526 and/ or affected virtual machines 509, 510 may drop the data packets instead of the controller 504. As discussed above, the function of the hypervisor 526 and the controller 504 may be merged into one component within or attached to the destination device 512.

Figure 6:
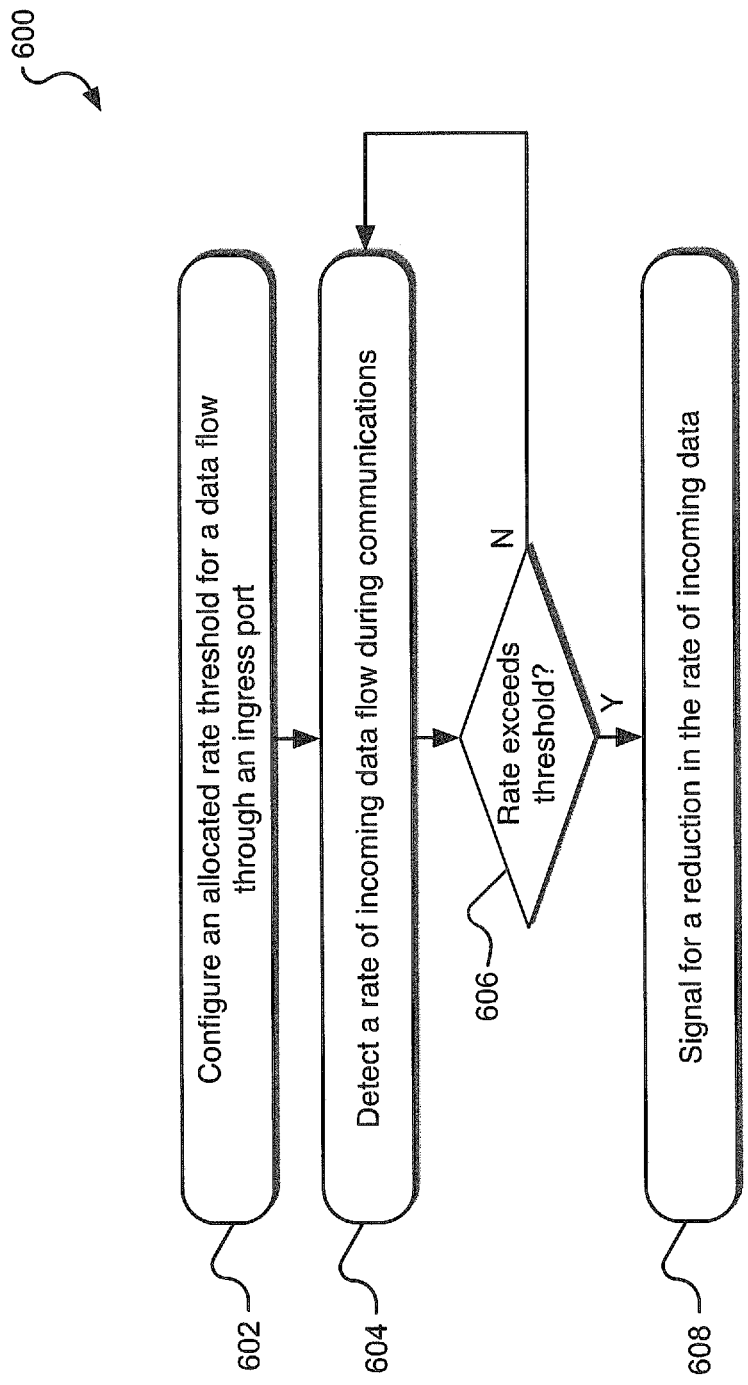
FIG. 6 illustrates example operations for ingress rate limiting.

FIG. 6 illustrates example operations 600 for ingress rate limiting. A configuring operation 602 configures a predetermined pre-determined rate threshold for a data flow through an ingress port in a destination device. In one implementation, the calculated threshold corresponds to a maximum data processing capability of the destination device. In another implementation, the pre-determined rate threshold corresponds to a service level agreement applying to the destination device. In yet another implementation, the destination device includes one or more virtual machines and the pre-determined rate threshold applies to a specific virtual machine and/or controller within the destination device.

A detecting operation 604 detects a rate of incoming data flow during communications. More specifically, a controller attached to or integrated as a part of the destination device monitors the ingress port for incoming data frames. The controller may measure a quantity of the data frames over time to determine the rate of incoming data frames. Further, the controller may track multiple incoming data traffic rates for multiple virtual machines within the destination device. Still further, each of the virtual machines may have different allocated rate thresholds.

A decision operation 606 decides if the detected rate of incoming data frames exceeds the pre-determined rate threshold for the destination device overall and/or the pre-determined rate threshold for one or more virtual machines within the destination device. In another implementation, the decision operation 606 is based on the detected rate of incoming data frames being within a predetermined range of the pre-determined rate threshold. If the detected rate of incoming data frames fails to exceed or come within the predetermined range of the pre-determined rate threshold, detecting operation 604 is repeated. Operations 604 and 606 may iteratively repeat over time until the decision operation 606 determines that the detected rate of incoming data frames has exceeded or come within the predetermined range of the pre-determined rate threshold. Iteration of operations 604 and 606 may occur within any timeframe ranging from fractions of a second to a few seconds and may be configurable.

When decision operation 606 determines that the detected rate of incoming data frames has exceeded or come within the predetermined range of the pre-determined rate threshold, a signaling operation 608 signals for a reduction in the rate of incoming data flow. The signaling operation may be accomplished by a controller associated with the destination device sending a unicast congestion message to a source device of at least some of the incoming data flow, a virtual machine within the destination device sending an explicit congestion notification to a source device of at least some of the incoming data flow, and/or the controller associated with the destination device dropping at least some packets of the incoming data flow, for example.

Figure 7:
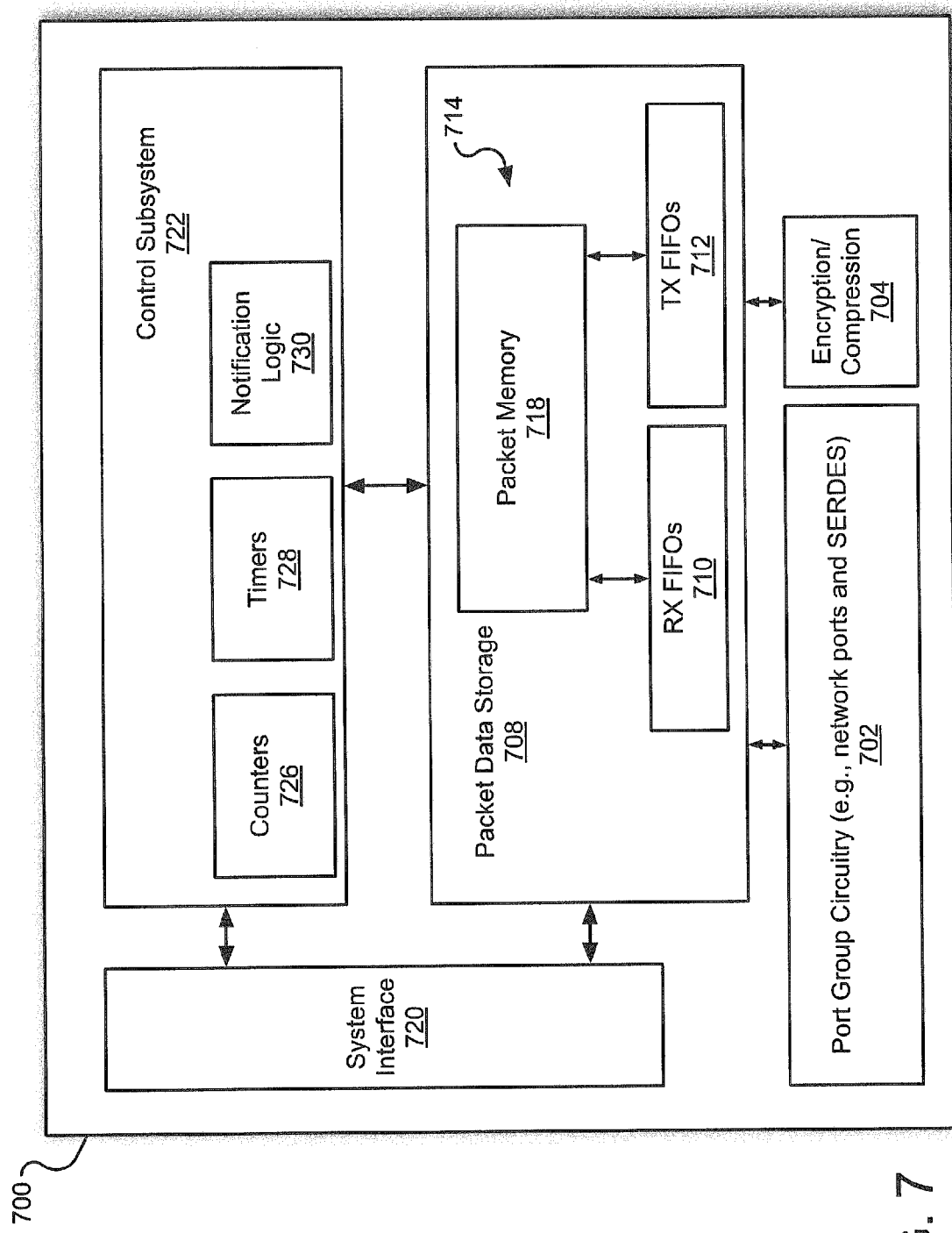
FIG. 7 illustrates an example network controller configured to implement ingress rate limiting.

FIG. 7 illustrates an example network controller 700 configured to implement ingress rate limiting. In the illustrated architecture, the network controller 700 may used to implement a host bus adapter, an Ethernet switch, a Fibre Channel switch, network interface controller, edge switch, etc. Port group circuitry 702 may include Fibre Channel ports, Ethernet ports, and Serializers/Deserializers (SERDES) for the network interface. Data packets are received and transmitted through the port group circuitry 702 during operation. Encryption/compression circuitry 704 contains logic to carry out encryption/compression or decompression/decryption operations on received and transmitted packets. The encryption/compression circuitry 704 is connected to internal ports and, in one implementation, can support up compression/decompression and/or encryption/decryption, although other configurations may support larger bandwidths for both or either operation. Some implementations may omit the encryption/compression 704.

Packet data storage 708 includes receive (RX) FIFOs 710 and transmit (TX) FIFOs 712 constituting assorted receive and transmit queues, one or more of which includes mirrored memories and is managed handled by redundancy logic. The packet data storage 708 also includes control circuitry (not shown) and centralized packet buffer memory 714, which includes one or more memory interfaces to store packet headers and payloads in packet memory 722. A system interface 720 provides a processor within the controller 700 with a programming and internal communications interface. The system interface 720 includes without limitation a PCI Express Core, a DMA engine to deliver packets, a packet generator to support multicast/hello/network latency features, a DMA engine to upload statistics to the processor, and top-level register interface block.

A control subsystem 722 includes without limitation counters 726, timers 728, and notification logic 730. The control subsystem 722 may include a processor (e.g., a microprocessor or other processing circuit) and other circuitry for executing firmware that performs ingress rate limiting operations, although the control logic may also be implemented in circuitry or in a computer system. Control logic circuitry may also be implemented in an application specific integrated circuit (ASIC), a field-programmable gate array (FPGA), a standard integrated circuit (IC), or other circuit components. All arriving packet descriptors are sequenced and passed through a pipeline of the control subsystem 722 until they reach their destination transmit queue. The counters 726 each count a quantity of data frames incoming to a destinations connected to the controller 700 (e.g., a virtual machine). The timers 728 track a quantity of time during which the incoming data frames are received to each destination. The control subsystem 722 utilizes the data frame count divided by the tracked quantity of time to determine an incoming data frame rate for each of the destinations of the incoming data frames. The notification logic 730 contains pre-determined rate thresholds for each of the destinations of the incoming data frames and is configured to send a notice to one or more sources of the incoming data frames when the incoming data frame rate exceeds or comes within a predetermined range of the pre-determined rate thresholds. The notification may take the form of a unicast congestion message to the one or more sources of the incoming data frames, a notice to the destination(s), which in turn sends an explicit congestion notification to the one or more sources of the incoming data frames, and/or dropping packets at the controller 700. In one implementation, the counters 726 and timers 728 are firmware driven and may be added or subtracted from the control subsystem 722 as necessary to suit the number and type of destinations connected to the controller 700.

The controller 700 may also include one or more processor-readable storage media encoding computer-executable instructions for executing one or more processes of dynamic latency-based rerouting on the network switch. It should also be understood that various types of switches (e.g., Fibre Channel switches, Ethernet switches, etc.) may employ a different architecture that that explicitly describe in the exemplary implementations disclosed herein.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A network device comprising:
   a controller for connection in a computer, the computer including a plurality of virtual machines, with each of the plurality of virtual machines having a maximum incoming data rate, the controller configured to detect data traffic received at an ingress port of the controller and directed to each of the plurality of virtual machines exceeding the maximum incoming data rate for each of the plurality of virtual machines, wherein the maximum incoming data rate is less than a data traffic capacity of the ingress port of the controller and the controller is further configured to provide a signal to at least one source of the data traffic directed to a given virtual machine of the plurality of virtual machines to reduce the data output of the at least one source to the virtual machine, responsive to detecting the data traffic received at the ingress port of the controller exceeding the maximum incoming data rate for the given virtual machine.

2. The network device of claim 1, wherein the controller provides the signal to all of the sources of the data traffic directed to the at least one virtual machine.

3. The network device of claim 1, wherein the controller provides the signal to the source of all of the sources of the data traffic directed to the at least one virtual machine that has the highest incoming data rate.

4. The network device of claim 1, wherein the maximum incoming data rate corresponds to a maximum data processing capability of the at least one virtual machine.

5. The network device of claim 1, wherein the maximum incoming data rate corresponds to a service level agreement applying to the at least one virtual machine.

6. The network device of claim 1, wherein the controller is further configured to originate the signal to the at least one source to reduce the data traffic output of the at least one source to the at least one virtual machine.

7. The network device of claim 6, wherein the signal includes a unicast congestion message.

8. The network device of claim 1,
wherein the controller is further configured to provide a congestion signal to the at least one virtual machine responsive to detecting the data traffic received at the ingress port of the controller exceeding the maximum incoming data rate for the at least one virtual machine and
wherein the at least one virtual machine is configured to originate the signal to the at least one source to reduce the data traffic output of the at least one source to the at least one virtual machine responsive to receiving the congestion signal from the controller.

9. The network device of claim 8, wherein the signal includes an explicit congestion notification.

10. The network device of claim 1, wherein the network device is a server and the controller is a network interface controller of the server.

11. One or more non-transitory processor-readable storage media encoding processor-executable instructions for executing in a processor a computer process comprising:
detecting data traffic received at an ingress port of a controller and directed to each of a plurality of virtual machines coupled to the controller exceeding a maximum incoming data rate of a given one of the plurality of virtual machines, wherein the maximum incoming data rate is less than a data traffic capacity of the ingress port of the controller; and
signaling at least one source of the data traffic directed to each of the given virtual machines to reduce the data output of the at least one source to each of the given virtual machines, responsive to the detecting operation.

12. The one or more non-transitory processor-readable storage media of claim 11, wherein the controller provides the signal to all of the sources of the data traffic directed to the at least one virtual machine.

13. The one or more non-transitory processor-readable storage media of claim 11, wherein the controller is further configured to originate the signal to the at least one source to reduce the data traffic output of the at least one source to the at least one virtual machine.

14. The one or more non-transitory processor-readable storage media of claim 11, further comprising:
providing a congestion signal to the at least one virtual machine responsive to detecting the data traffic received at the ingress port of the controller exceeding the maximum incoming data rate for the at least one virtual machine to allow the at least one virtual machine to originate the signal to the at least one source to reduce the data traffic output of the at least one source to the at least one virtual machine responsive to receiving the congestion signal from the controller.

15. A method comprising:
detecting data traffic received at an ingress port of a controller and directed to each virtual machine of a plurality of virtual machines coupled to the controller exceeding a maximum incoming data rate of a given one of the plurality of virtual machines, wherein the maximum incoming data rate is less than a data traffic capacity of the ingress port of the controller; and
signaling at least one source of the data traffic directed to each of the given virtual machines to reduce data output of the at least one source to each of the given virtual machines, responsive to the detecting operation.

16. The method of claim 15, wherein the controller provides the signal to all of the sources of the data traffic directed to the at least one virtual machine.

17. The method of claim 15, wherein the controller is further configured to originate the signal to the at least one source to reduce the data traffic output of the at least one source to the at least one virtual machine.

18. The method of claim 15, further comprising:
providing a congestion signal to the at least one virtual machine responsive to detecting the data traffic received at the ingress port of the controller exceeding the maximum incoming data rate for the at least one virtual machine to allow the at least one virtual machine to originate the signal to the at least one source to reduce the data traffic output of the at least one source to the at least one virtual machine responsive to receiving the congestion signal from the controller.

* * * * *